(12) United States Patent
Betsuyaku

(10) Patent No.: US 12,282,692 B2
(45) Date of Patent: Apr. 22, 2025

(54) PRINT CONTROL DEVICE AND NON-TRANSITORY COMPUTER READABLE MEDIUM STORING PROGRAM

(71) Applicant: FUJIFILM Business Innovation Corp., Tokyo (JP)

(72) Inventor: Takashi Betsuyaku, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 395 days.

(21) Appl. No.: 17/224,147

(22) Filed: Apr. 7, 2021

(65) Prior Publication Data

US 2022/0075567 A1 Mar. 10, 2022

(30) Foreign Application Priority Data

Sep. 7, 2020 (JP) .................................. 2020-149523

(51) Int. Cl.
G06F 3/12 (2006.01)

(52) U.S. Cl.
CPC ............ G06F 3/121 (2013.01); G06F 3/1234 (2013.01)

(58) Field of Classification Search
CPC ........ G06F 3/121; G06F 3/1282; G06F 3/126; G06F 3/1234
See application file for complete search history.

(56) References Cited

U.S. PATENT DOCUMENTS

| 7,986,421 | B2* | 7/2011 | Chen | G06F 3/1207 |
| | | | | 358/1.14 |
| 8,705,998 | B2 | 4/2014 | Kimura | |
| 9,207,893 | B2 | 12/2015 | Hasegawa | |
| 2005/0031367 | A1* | 2/2005 | Fukaya | G03G 15/50 |
| | | | | 399/85 |
| 2018/0196626 | A1* | 7/2018 | Mutsuno | G06F 3/1248 |

FOREIGN PATENT DOCUMENTS

| JP | 2003312106 | 11/2003 |
| JP | 2011005671 | 1/2011 |
| JP | 2011020396 | 2/2011 |
| JP | 2012135958 | 7/2012 |
| JP | 2014119676 | 6/2014 |
| JP | 2015227009 | 12/2015 |

OTHER PUBLICATIONS

"Office Action of Japan Counterpart Application", issued on Jun. 25, 2024, with English translation thereof, p. 1-p. 9.

* cited by examiner

Primary Examiner — John R Wallace
(74) Attorney, Agent, or Firm — JCIPRNET

(57) ABSTRACT

A print control device includes a processor configured to upon execution of jobs in succession, obtain a result of inspection of printed materials available as a result of execution of the jobs, and upon detection of a failed printed material in the inspection, execute only one or more jobs which are not affected by a cause of the failed printed material, the one or more jobs being among multiple jobs which have not been executed yet.

2 Claims, 4 Drawing Sheets

FIG. 3A

| JOB | A | B | C | D | E | F | G | H | I |
|---|---|---|---|---|---|---|---|---|---|
| YELLOW COLOR | TO BE USED | NOT NEEDED | TO BE USED | TO BE USED | NOT NEEDED | NOT NEEDED | TO BE USED | NOT NEEDED | TO BE USED |

FIG. 3B (TO BE EXECUTED)

| JOB | B | E | F | H |
|---|---|---|---|---|
| YELLOW COLOR | NOT NEEDED | NOT NEEDED | NOT NEEDED | NOT NEEDED |

(TO BE SUSPENDED)

| JOB | A | C | D | G | I |
|---|---|---|---|---|---|
| YELLOW COLOR | TO BE USED | TO BE USED | TO BE USED | TO BE USED | TO BE USED |

FIG. 4A

| JOB | A | B | C | D | E | F | G | H | I |
|---|---|---|---|---|---|---|---|---|---|
| YELLOW COLOR | TO BE USED | NOT NEEDED | TO BE USED | TO BE USED | NOT NEEDED | NOT NEEDED | TO BE USED | NOT NEEDED | TO BE USED |
| PROCESS OF JOB | LONG | SHORT | SHORT | LONG | LONG | SHORT | SHORT | LONG | SHORT |

FIG. 4B (TO BE EXECUTED)

| JOB | B | E | F | H |
|---|---|---|---|---|
| YELLOW COLOR | NOT NEEDED | NOT NEEDED | NOT NEEDED | NOT NEEDED |
| PROCESS OF JOB | SHORT | LONG | SHORT | LONG |

(TO BE EXECUTED WITH FAILURE)

| JOB | C | G | I |
|---|---|---|---|
| YELLOW COLOR | TO BE USED | TO BE USED | TO BE USED |
| PROCESS OF JOB | SHORT | SHORT | SHORT |

(TO BE SUSPENDED)

| JOB | A | D |
|---|---|---|
| YELLOW COLOR | TO BE USED | TO BE USED |
| PROCESS OF JOB | LONG | LONG |

PRINT CONTROL DEVICE AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-149523 filed on Sep. 7, 2020.

BACKGROUND

(i) Technical Field

The present disclosure relates to a print control device and a non-transitory computer readable medium storing a program.

(ii) Related Art

In the digital printing market, a function of inspecting print results is utilized to ensure the quality of printed material. Digital printing machines for continuous forms which print on continuous paper such as rolled paper record information showing inspection results of each page by embedding the results into a blank area of the page.

A commonly-known technique replaces a printed material failed in inspection with a printed material passed in inspection by reprinting in a later process.

An example of the related art is disclosed in, for example, Japanese Unexamined Patent Application Publication No. 2015-227009.

SUMMARY

It is common that when jobs are successively executed by a digital printing machine and inspection of printed materials as a result of execution of one of the jobs detects a failed printed material during the execution of the jobs, the digital printing machine is temporarily stopped at that time without considering the effect of the cause of the failed printed material on subsequent jobs, and after the cause is eliminated, the digital printing machine is restarted and execution of the job is resumed.

Aspects of non-limiting embodiments of the present disclosure relate to a print control device that, when jobs, for which printed materials are obtained as execution results, are successively executed, and inspection of the printed materials detects a failed printed material, performs printing efficiently, as compared with when printing is stopped without exception and the failed printed material is coped with.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a print control device including a processor configured to upon execution of jobs in succession, obtain a result of inspection of printed materials available as a result of execution of the jobs, and upon detection of a failed printed material in the inspection, execute only one or more jobs which are not affected by a cause of the failed printed material, the one or more jobs being among a plurality of jobs which have not been executed yet.

BRIEF DESCRIPTION OF THE DRAWINGS

Exemplary embodiment of the present disclosure will be described in detail based on the following figures, wherein:

FIG. 3A is a table illustrating the order of execution of the jobs not executed yet among the jobs to be successively executed in the exemplary embodiment;

FIG. 3B is a table illustrating the order of arrangement of jobs after the jobs illustrated in FIG. 3A are rescheduled;

FIG. 4A is a table illustrating the order of execution of the jobs not executed yet among the jobs to be successively executed in the exemplary embodiment; and FIG. 4B is a table illustrating the order of arrangement of jobs after the jobs illustrated in FIG. 4A are rescheduled.

DETAILED DESCRIPTION

Hereinafter, an exemplary embodiment of the present disclosure will be described based on the drawings.

Figure 1:
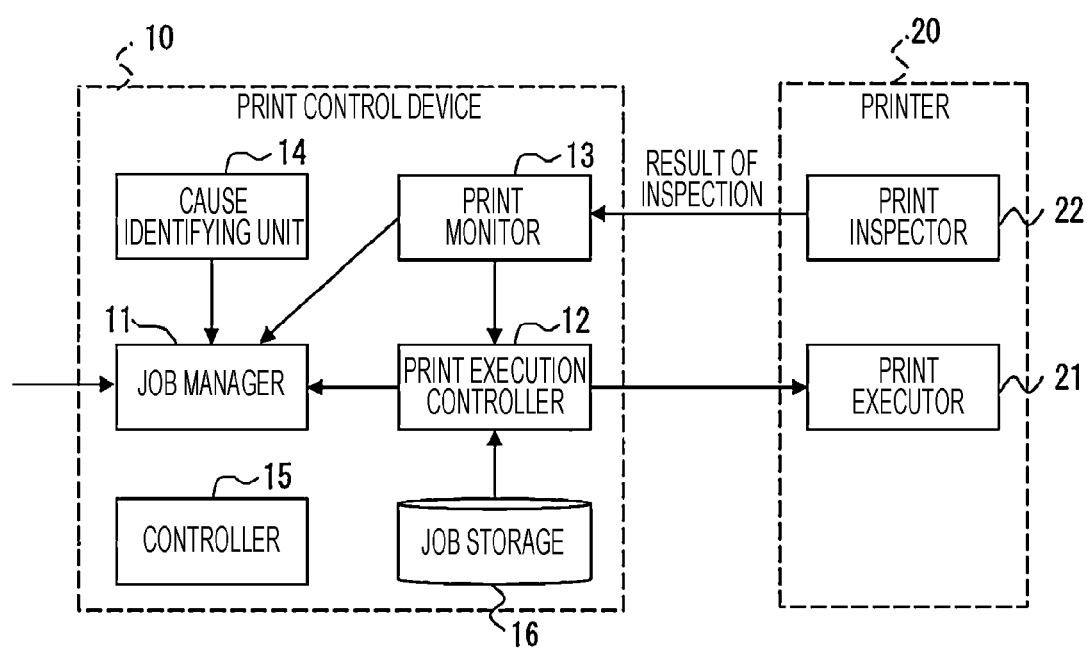
FIG. 1 is a block configuration diagram of a printing system in an exemplary embodiment.

FIG. 1 is a block configuration diagram of a printing system in the exemplary embodiment. FIG. 1 illustrates a printer 20 that executes printing, and a print control device 10 that controls the execution of printing by the printer 20.

The printer 20 in the exemplary embodiment is a digital printing machine for continuous forms that performs printing on continuous paper such as rolled paper. The printer 20 has a print executor 21 that performs printing, and a print inspector 22 that inspects the printed material outputted by the print executor 21.

The print executor 21 executes one or more jobs according to instructions from the print control device 10, thereby performing printing on continuous paper. The print executor 21 basically forms multiple pages on continuous paper by executing a job. Thus, the printed material formed by the print executor 21 corresponds to the pages. The print inspector 22 inspects one page at a time. A standard for determining whether the quality of printed material passes or fails inspection is set in advance, and the print inspector 22 determines whether each printed material has passed or failed depending on whether the standard is satisfied.

The print control device 10 in the exemplary embodiment controls the execution of print by the printer 20 as described above. The print control device 10 can be implemented in a hardware configuration of a general-purpose computer which has existed in the past. In other words, the print control device 10 is configured by connecting a CPU, a ROM, a RAM, a hard disk drive (HDD) as a storage unit, a network interface (IF) provided as a communication unit, and a user interface including an input unit and a display unit to an internal bus.

The print control device 10 in the exemplary embodiment has a job manager 11, a print execution controller 12, a print monitor 13, a cause identifying unit 14, a controller 15 and a job storage 16 as illustrated in FIG. 1. It is to be noted that the components not used for description in the exemplary embodiment are omitted from the drawings.

The job manager 11 receives a job as a print request, and registers the job in the job storage 16. In addition, the job manager 11 performs job management such as registration, deletion of a job, and schedule management such as determination of an order of execution of registered jobs. In the schedule management, particularly, the job manager 11 obtains from the print monitor 13 a result of inspection of a printed material available as a result of execution of a job, and when a printed material which has failed the inspection is detected, the job manager 11 makes rescheduling so as to execute only those jobs which are not affected by the cause of the failed printed material, the jobs being among multiple jobs which have not been executed yet.

The print execution controller 12 performs control so that the jobs registered in the job storage 16 are executed according to a schedule. The print monitor 13 monitors the printing status, the inspection status and the like in the printer 20. In the exemplary embodiment, a result of inspection of each printed material is obtained from the print inspector 22 as illustrated in FIG. 1. The cause identifying unit 14 identifies the cause of a failed printed material in the inspection. The controller 15 controls the operation of each of the components 11 to 14.

The job storage 16 stores job information including attribute information of a job, such as identification information of a job such as a job ID, the date of reception of a job, a job size, and attribute information of a printed material produced by execution of a job, such as the amount of printed material (the page size and the number of sheets of each size, the volume of continuous paper to be used). The job information also includes information on the deadline for delivery of the printed material described below and the quality required. Also, the order of execution of jobs, in other words, schedule information is set according to the order of arrangement of the job information.

The components 11 to 15 in the print control device 10 are achieved by the coordinated operation between the computer that forms part of the print control device 10, and programs operated by a CPU installed in the computer. Also, the job storage 16 is implemented by an HDD installed in the print control device 10. Alternatively, a RAM or an external storage unit may be used via a network.

Also, the programs used in the exemplary embodiment may be provided by being stored in a computer-readable recording medium such as a CD-ROM and a USB memory as well as be provided by a communication unit. The programs provided from a communication unit and a recording medium are installed in the computer, and the programs are successively executed by the CPU of the computer, thereby implementing various types of processing.

When a job is executed by the printing system, a printed material is formed on continuous paper as a result of execution. Although the printed material is produced by printing as specified in the attribute information, the quality may not be achieved as desired due to, for instance, dirt of a nozzle which outputs ink. The print inspector 22 inspects the quality of each printed material produced, and as described above, determines a printed material not meeting a predetermined standard to be failed. When a printed material failed in the inspection is detected during successive execution of multiple jobs, normally, the printer 20 is temporarily stopped at the time of detection of the failed printed material, and after the measures for eliminating the cause of the failed printed material are taken, the printer 20 is restarted. Then, execution of the subsequent jobs is resumed.

A printed material failed in the inspection has some cause. An example of cause is damage of the nozzle which outputs ink of a specific color, for instance. In that case, the printer 20 is stopped, and the cause of the failed printed material is eliminated by replacing the nozzle, and subsequently, the printer 20 is restarted. Thus, it is expected that each printed material using the ink of the specific color in the subsequent jobs should not be failed in the inspection due to the same cause. However, on the other hand, jobs producing printed materials not using the ink of the specific color in the subsequent jobs are each suspended due to the stop of the printer 20 even though the jobs are executable.

Figure 2:
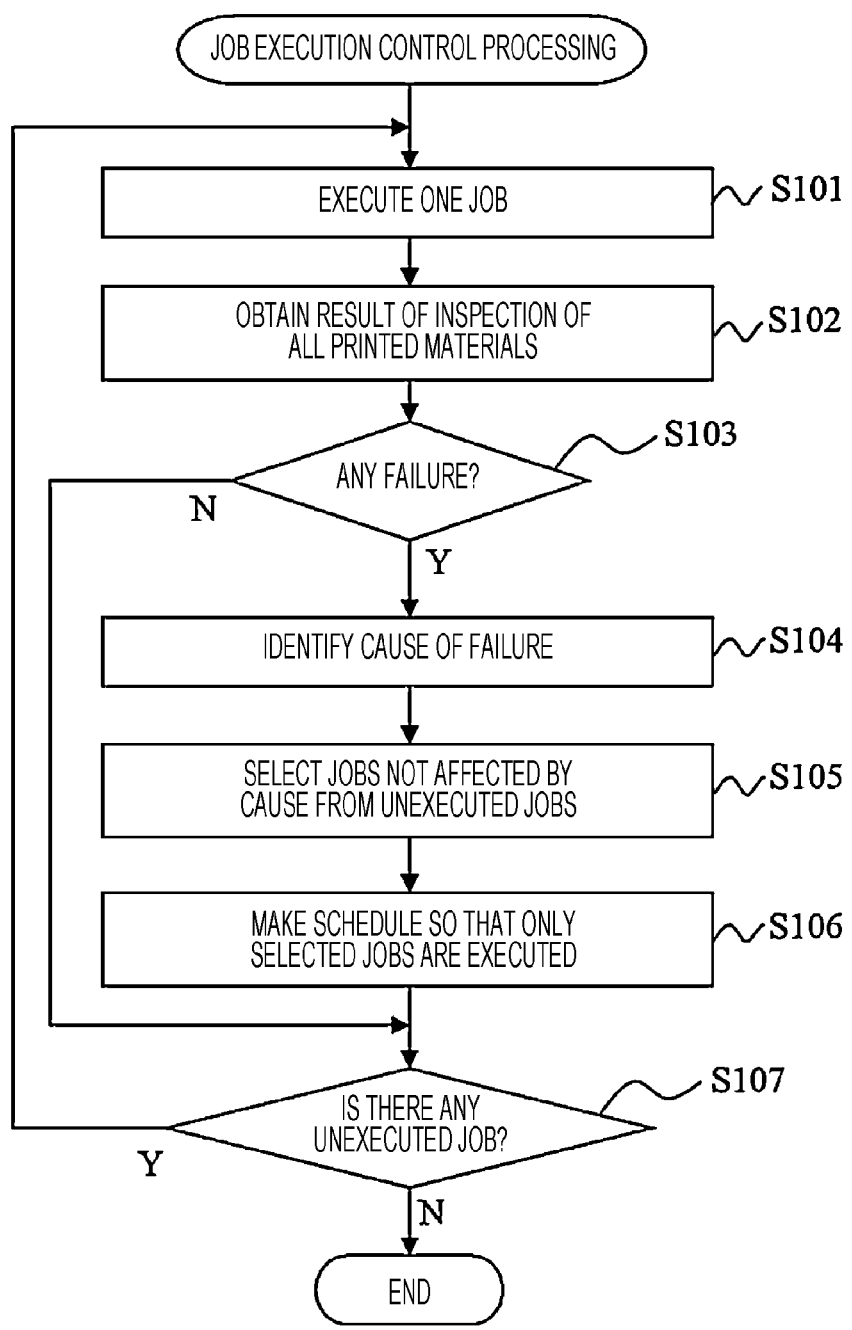
FIG. 2 is a flowchart illustrating the basic processing of print control processing in the exemplary embodiment.

Thus, in the exemplary embodiment, it is characterized that execution of jobs is controlled so that when the jobs are successively executed, and a failed printed material is detected in inspection, only those jobs which are not affected by the cause of the failed printed material are executed, the jobs being among multiple jobs which have not been executed yet. Hereinafter, the basic processing of the job execution control processing in the exemplary embodiment will be described with reference to the flowchart illustrated in FIG. 2. FIG. 2 illustrates the case where printed material is formed on continuous paper by successively executing jobs.

The print execution controller 12 retrieves a job to be executed first among the jobs successively executed from the job storage 16, and sends the job to the printer 20 for execution (step 101). In the exemplary embodiment, jobs are successively executed, and it is assumed that the start of execution of each job can be controlled at each time. Specifically, without being limited to the case where the jobs to be successively executed are executed unconditionally according to a schedule, even when execution of the immediately previous job is finished, the start timing of the subsequent job to be executed may be controlled by the print execution controller 12. In the exemplary embodiment, the latter case is assumed.

The print executor 21 in the printer 20 starts execution of a job which has been sent. Also, each time the print executor 21 produces a printed material, the print inspector 22 inspects the printed material. When the execution of the job is finished, the print monitor 13 obtains results of inspection of all printed materials from the print inspector 22 (step 102). Here, when all printed materials pass the inspection, and no printed material which has failed the inspection is detected (N in step 103), the processing associated with the job is finished. When there is a job to be executed subsequently (Y in step 107), the processing target is transferred to the job (step 101).

However, when even one printed material failed in the inspection is detected (Y in step 103), the controller 15 activates the cause identifying unit 14. When being activated, the cause identifying unit 14 identifies the cause (hereinafter also referred to as the "cause of failure") of production of the printed material which has failed the inspection (step 104). Here, a description is given using an example in which a printed material has failed the inspection due to occurrence of abnormality at the head which outputs Y color ink. For the sake of convenience of description, it is assumed that only those printed materials using the Y color have failed.

It is to be noted that in the exemplary embodiment, the results of inspection of all printed materials produced in one job are collectively obtained in step 102, thus printed materials which have failed the inspection due to multiple causes of failure may be detected. Thus, in order to find out one of the causes of failure, the processing in step 104 may be performed at the stage when a printed material which has failed the inspection is first detected during the execution of one job.

When a cause of failure is identified, the job manager 11 obtains the identified cause of failure from the cause identifying unit 14. The job manager 11 then extracts a job which is not affected by the cause of failure from the jobs not executed yet (also referred to as "unexecuted jobs") among the jobs to be successively executed, in other words, extracts a job which does not use the Y color (step 105). Whether the Y color is used or not can be determined by referring to the job information.

Subsequently, the job manager 11 reschedules the jobs so that only the extracted jobs among the unexecuted jobs are executed (step 106), and updates the job storage 16 with the content of the rescheduled jobs. The print execution controller 12 executes the unexecuted jobs in the order rescheduled (Y in step 107, step 101).

As described above, in the exemplary embodiment, when a failed printed material is detected, only those jobs which are not affected by the cause of the failed printed material are extracted from the jobs which have not been executed yet, and executed preferentially. Consequently, the jobs not affected by the cause of failure can be executed without stopping the printer 20, thus printing can be performed efficiently.

It is to be noted that execution of the jobs which are affected by the cause of the failed printed material is suspended, the jobs being among the multiple jobs which have not been executed yet. Basically, after the execution of the jobs not affected by the cause of failure, a user stops the printer 20, eliminates the cause of failure, and after the restart of the printer 20, the user resumes the execution of the suspended job.

It is to be noted that in the case where the results of inspection of all printed materials are obtained when the execution of a job is finished, multiple causes of failure may be identified as described above. In the exemplary embodiment, even this case can be coped with by extracting and executing the jobs not affected by any of the causes of failure and suspending the jobs affected by at least one of the causes of failure.

Hereinafter, the above-mentioned job execution control processing will be described by showing a specific example.

FIG. 3A is a table illustrating the order of execution of the jobs not executed yet among the jobs to be successively executed, in short, the order of execution of unexecuted jobs. Specifically, it is assumed that in the job executed immediately before the leading job A in FIG. 3A, a printed material which has failed inspection is detected due to abnormality of the head which outputs the Y color ink. Each of jobs A to I is associated with corresponding information which is identified by the job information and which indicates whether the Y color is used or not. In FIG. 3A, "to be used" corresponding to an item of the Y color indicates that the Y color is used, and "not needed" indicates that the Y color is not used.

As described above, when the cause of failure is identified (step 104), the job manager 11 extracts those jobs which are not affected by the cause of failure (step 105). Specifically, the job manager 11 extracts the jobs B, E, F, H which do not use the Y color. The job manager 11 then makes rescheduling so that the jobs B, E, F, H are executed without stopping the printer 20 as illustrated in FIG. 3B (step 106). The job manager 11 then suspends the execution of the jobs A, C, D, G, I which are affected by the cause of failure.

However, of course, some jobs have a relatively long printing process, and other jobs have a relatively short printing process. In the exemplary embodiment, a long printing process is equivalent to a large amount of produced printed material, and a long print time. In the exemplary embodiment, whether the printing process is long or short is determined by the amount of printed material produced by the execution of each job. Specifically, when a predicted amount of printed material obtained by the execution of a job is greater than or equal to a predetermined threshold, the job is determined to have a relatively long printing process (hereinafter a "long job"). On the other hand, when a predicted amount of printed material obtained by the execution of a job is less than a predetermined threshold, the job is determined to have a relatively short printing process (hereinafter a "short job"). A long job needs a greater print time than a short job needs. Thus, a long job has much more effect on the print efficiency in the entire jobs to be successively executed. Thus, in the exemplary embodiment, a long job and a short job can be coped with in different manners. Hereinafter, the difference between the execution control for a long job and a short job will be described with reference to FIGS. 4A and 4B.

FIG. 4A show a table in which each job illustrated in FIG. 3A is associated with the type of job indicating the printing process of the job. The "long" and "short" are set to the above-described long job and short job, respectively.

As described above, when the cause of failure is identified (step 104), the job manager 11 extracts those jobs which are not affected by the cause of failure (step 105). Specifically, the job manager 11 extracts the jobs B, E, F, H which do not use the Y color regardless of the type of each job. The job manager 11 then makes rescheduling so that the jobs B, E, F, H are executed without stopping the printer 20 as illustrated in FIG. 4B (step 106).

In contrast, the job manager 11 handles the jobs affected by the cause of failure by the treatment described below.

First, as part of the treatment, the jobs are dichotomized according to the type of job as illustrated in FIG. 4B. Specifically, the jobs are divided into the jobs C, G, I corresponding to short jobs and the jobs A, D corresponding to long jobs. Although it can be predicted that the printed materials produced by the execution of the short jobs will fail the inspection, the job manager 11 makes rescheduling so that the short jobs are executed without stopping the printer 20. The jobs C, G, I corresponding to the short jobs may be executed subsequent to the jobs B, E, F, H which are not affected by the cause of failure, or the jobs B, C, E, F, G, H, I may be executed in that order in a mixed manner, that is, according to the order of execution illustrated in FIG. 4A.

In the exemplary embodiment, the short jobs affected by the cause of failure are executed by the following reason.

Each job has its attribute. As an attribute, the amount of produced printed materials mentioned above, that is, a long job and a short job are provided. In addition, the quality, the deadline for delivery required for the printed material are also regarded as attributes. In the exemplary embodiment, the execution of each job is controllable according to the attributes of the job. It is to be noted that the attribute information of a job includes the attributes of the printed material produced by execution of the job as described above. The attribute information is included in the job information.

It is to be noted that since the deadline for delivery can be set in terms of the number of days, it is possible to easily determine whether the deadline for delivery is short by comparison with a threshold. It is assumed that the quality is set in the attribute information in terms of an attribute value, such as high/low, high/medium/low, which can be compared with a threshold.

When a job has an attribute of short job, even if inspection failure of a printed material is predicted, the printed material is produced by the printer 20 by executing the job as illustrated in FIG. 4B. This is because even when a printed material fails in accordance with the standard for determining pass or fail by the print inspector 22, high quality which ensures pass determined by the print inspector 22 may not be practically required, and as a result of visual inspection by an inspector, the finished printed material may not be a failed printed material, for instance. In other words, the visual inspection by an inspector may determine that the quality is ensured to a certain degree. In that case, a printed material, which has failed the inspection by the print inspector 22, may be used as an article as it is. Even if an inspector determines that the printed material has failed inspection similarly to the print inspector 22, in the case of a short job, the print time is shorter than in a long job, thus reprinting probably causes less time loss. Also, since the amount of printed material is relatively smaller than that of a long job, loss in the cost is probably less. Thus, even when a short job is executed, for which the printed material is predicted to fail, the efficiency of printing is probably not reduced as in the case of a long job. Therefore, even in the case of a short job which is to be affected by the cause of failure, the job is designed to be executed under prediction of failure.

Also, when the deadline for delivery as an attribute of a job is referred to, and a short deadline for delivery is required, such as in the case of a job with an urgent deadline for delivery, that is, a job with a high degree of urgency, the short job may be executed in order to give priority to the deadline for delivery over the quality.

In the above description, execution of a job is controlled, that is, execution of suspension is selected according to the attributes of the job which is affected by the cause of failure. However, a user may be allowed to select execution of suspension of the job. This is because a user can consider an attribute which cannot be represented by the attribute information set in the job information. Specifically, information which can identify the names and printed materials of short jobs is listed on the user interface, the short jobs being among the unexecuted jobs and affected by the cause of failure, then a user is allowed to select execution of suspension of each of the short jobs.

So far, the case has been described where the disclosure is applied to short jobs among the jobs affected by the cause of failure. However, it is not intended to deny similar handling to long jobs. In the case of a long job, as a result of execution of printing under prediction of failure, failure occurs after all, and time loss and loss in the cost during reprinting increase significantly. Thus, in the exemplary embodiment, only short jobs are designed to be executed.

In the above description, execution of a job is controlled according to the attributes of the job. In addition, when a job is suspended, printing by the printer 20 is stopped, then the cause of failure is eliminated, and after the printer 20 is restarted, execution of the job is started. Alternatively, continuation or suspension of printing may be determined according to a predicted time length taken for eliminating the cause of failure.

That is, the time taken for eliminating the cause of failure probably varies depending on the type of the cause. When the time taken for measures to eliminate the cause of failure is relatively long, and predicted to be greater than or equal to a predetermined threshold, for instance, when a component which fulfills part of the function of the printer 20 is repaired and an operation check is made, execution of the job needs to be suspended for a long time. Thus, printing may be continued to give priority to the execution of the job. For a short job affected by the cause of failure, a produced printed material probably fails the inspection. However, the job is executed because the priority is given to the deadline for delivery, and the print efficiency.

Alternatively, when the time taken for measures to eliminate the cause of failure is relatively short, and predicted to be less than a predetermined threshold, for instance, when a component replacement work is simply performed, printing may be stopped. While the printing is stopped, the measures to eliminate the cause of failure are taken, and after the printer 20 is restarted, execution the unexecuted job which has been suspended is started. In this manner, for instance, the jobs A to I illustrated in FIG. 4A are executed in that order by giving priority to the quality of the printed materials, thus the quality of the printed material produced by the execution of each job is maintained.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A print control device comprising a processor configured to:
   upon execution of jobs in succession, obtain a result of inspection of printed materials available as a result of execution of the jobs;
   upon detection of a failed printed material in the inspection, specify one or more colors which are a cause of the failed printed material;
   suspend execution of one or more jobs in which the specified one or more colors are used, the one or more jobs being among the plurality of jobs;
   when an amount of printed material obtained by execution of the one or more job is less than a predetermined threshold, receive a selection from execution or cancellation of the one or more jobs by a user; and
   execute the one or more jobs in response to the execution being selected in the selection.

2. A non-transitory computer readable medium storing a program causing a computer to execute a process comprising:
   upon execution of jobs in succession, obtaining a result of inspection of printed materials available as a result of execution of the jobs;
   upon detection of a failed printed material in the inspection, specifying one more colors which are a cause of the failed printed material;

suspending execution of one or more jobs in which the specified one or more colors are used, the one or more jobs being among the plurality of jobs;

when an amount of printed material obtained by execution of the one or more job is less than a predetermined threshold, receiving a selection from execution or cancellation of the one or more jobs by a user; and executing the one or more jobs in response to the execution being selected in the selection.

* * * * *